US008324781B2

(12) United States Patent
Goto et al.

(10) Patent No.: US 8,324,781 B2
(45) Date of Patent: Dec. 4, 2012

(54) ROTATING ELECTRIC MACHINE AND MANUFACTURING METHOD THEREOF (75) Inventors: Tsuyoshi Goto, Hitachinaka (JP); Kenichi Nakayama, Hitachinaka (JP); Yasuyuki Saito, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 312 days.

(21) Appl. No.: 12/791,361

(22) Filed: Jun. 1, 2010

(65) Prior Publication Data

US 2010/0301698 A1 Dec. 2, 2010

(30) Foreign Application Priority Data

Jun. 2, 2009 (JP) .................................. 2009-132657

(51) Int. Cl.
*H02K 21/12* (2006.01)

(52) U.S. Cl. ................................. 310/216.117; 310/422

(58) Field of Classification Search ........... 310/216.004, 310/216.049, 216.053, 216.113, 216.114, 310/216.117, 216.129, 261.1, 262, 422, 211
See application file for complete search history.

(56) References Cited

U.S. PATENT DOCUMENTS

| 1,158,463 | A | * | 11/1915 | Eaton ............................... 29/598 |
| 2,157,046 | A | * | 5/1939 | Wood ............................ 310/422 |
| 4,028,573 | A | * | 6/1977 | Terrone .................. 310/216.115 |
| 5,894,183 | A | * | 4/1999 | Borchert ................ 310/216.013 |
| 6,753,637 | B2 | * | 6/2004 | Tornquist et al. .......... 310/261.1 |

FOREIGN PATENT DOCUMENTS

JP 2009-33908 A 2/2009

* cited by examiner

*Primary Examiner* — Dang Le
(74) *Attorney, Agent, or Firm* — Crowell & Moring LLP (57) ABSTRACT A rotating electric machine includes: a stator and a rotor, wherein the rotor includes a rotor core in which rotor plates punched from roll formed magnetic steel plate are laminated, and a spider that retains the rotor core; the rotor plates and the rotor core include a plurality of keys arranged in their inner circumference contacting with the spider; the spider includes a plurality of keyways arranged in its outer circumference contacting with the rotor; a plurality of keys of the rotor core and a plurality of keyways of the spider are formed in such a manner that they fit with each other; and the plurality of keys of the rotor core and the plurality of keyways of the spider fit in a combination that renders a weight imbalance of the rotor core due to lamination of the rotor plates and a weight imbalance of the spider cancel each other.

11 Claims, 13 Drawing Sheets

ROTATING ELECTRIC MACHINE AND MANUFACTURING METHOD THEREOF

INCORPORATION BY REFERENCE

The disclosure of the following priority application is herein incorporated by reference: Japanese Patent Application No. 2009-132657 filed Jun. 2, 2009.

BACKGROUND OF THE INVENTION

1. Field of the Invention

The present invention relates to a rotating electric machine and a manufacturing method thereof.

2. Description of the Related Art

In general, steel plate material of magnetic steel plates used for a rotor of a rotating electric machine is roll formed. With the process of manufacture of rolling, deviations are unavoidable in widthwise thickness of the steel plate material. In the event that such steel plate material is punched so as to manufacture rotor plates used for laminated bodies such as rotor cores, deviations in thickness having a certain directionality according to rolling direction remain on each of the rotor plates.

When steel plate material is punched keeping the rolling direction and the produced rotor plates are laminated so as to manufacture a laminated body such as rotor cores, tiny amount of deviation in thickness included in each of the rotor plate materials is accumulated in the laminated body and comes out as a large amount of deviation in thickness. A great mass imbalance occurs at a rotor in which the laminated body is assembled as it is manufactured. In order to resolve the mass imbalance, a balancing process is provided after the assembly, and the final mass balance is achieved by boring therein an adjustment hole or the like.

There is a method known in the related art in which rotor cores are manufactured by laminating rotor plates with rotating the direction of each plate, which we call as "rotary lamination", so as to avoid such accumulation of deviations in thickness in the laminated body (refer to Japanese Laid Open Patent Publication No. 2009-33908).

SUMMARY OF THE INVENTION

However, there are problems such as that punch equipment configured so as to achieve rotary lamination assumes a complex structure, which requires a large investment in facilities. In some cases, an initial imbalance that can not be adjusted by the balancing process described above may occur.

The present invention intends to provide a rotating electric machine and a manufacturing method thereof with high productivity which do not require complex equipment and extra processes.

According to the 1st aspect of the present invention, a rotating electric machine comprises: a stator and a rotor that is rotatably provided through a rotary gap with respect to the stator, wherein the rotor includes a rotor core in which rotor plates punched from roll formed magnetic steel plate are laminated, and a spider that retains the rotor core; the rotor plates and the rotor core include a plurality of keys arranged in their inner circumference contacting with the spider; the spider includes a plurality of keyways arranged in its outer circumference contacting with the rotor; a plurality of keys of the rotor core and a plurality of keyways of the spider are formed in such a manner that they fit with each other; and the plurality of keys of the rotor core and the plurality of keyways of the spider fit in a combination that renders a weight imbalance of the rotor core due to lamination of the rotor plates and a weight imbalance of the spider cancel each other.

According to the 2nd aspect of the present invention, in a rotating electric machine according to the 1st aspect, it is preferred that at least one of the plurality of keyways of the spider is formed as a small width keyway which has a smaller width than other keyways, and among the plurality of keys of the rotor core, a rotor core minimum mass key, which shows that a mass of the rotor core in a direction in which the rotor minimum mass key exists is minimum, is fitted into the small width keyway.

According to the 3rd aspect of the present invention, in a rotating electric machine according to claim 2, it is preferred that in position of the rotor core minimum mass key, among the plurality of keys of the rotor plates, a rotor plate minimum mass key, a rotor plate minimum mass key, which is a key indicating a part of the rotor plate where the rotor plate have less thickness than other part is piled up.

According to the 4th aspect of the present invention, in a rotating electric machine according to claim 2, it is preferred that an identification marking is provided in a vicinity of the rotor core minimum mass key.

According to the 5th aspect of the present invention, in a rotating electric machine according to claim 1, it is preferred that the rotor core is fitted into the spider by shrink-fitting, whereby the rotor core is fitted into the spider in such a manner that the keys and the keyways are fitted together.

According to the 6th aspect of the present invention, in a rotating electric machine according to claim 1, it is preferred that magnet insertion holes are formed in the rotor core, and magnets are respectively inserted into the magnet insertion holes.

According to the 7th aspect of the present invention, in a rotating electric machine according to claim 1, it is preferred that a shaft is fitted into the spider and as well a ring plate is fitted into the spider, and a balance adjustment hole, through which a weight imbalance that is left behind after weight imbalance cancellation by a combination of the rotor core and the spider is complementary cancelled, is formed in the ring plate.

According to the 8th aspect of the present invention, in a rotating electric machine according to claim 2, it is preferred that the rotor core is provided with lamination of the rotor plates, wherein the rotor plates are rotary laminated as needed, so that a part of a rotor core in a position of the rotor core minimum mass key is smaller in mass than any other part located in positions of other keys: a shaft is fitted into the spider and as well a ring plate is fitted into the spider, and a balance adjustment hole, through which a weight imbalance that is left behind after weight imbalance cancellation by a combination of the rotor core and the spider is complementary cancelled, is formed in the ring plate.

According to the 9th aspect of the present invention, in a rotating electric machine according to claim 2, it is preferred that the rotor core is provided by rotationally stacking an odd number of blocks, wherein in each block a rotor plate minimum mass key, which is a key indicating a part of the rotor plate where the rotor plate have less thickness than other part, is piled up.

According to the 10th aspect of the present invention, in a rotating electric machine according to claim 1, it is preferred that a rotating electric machine is an induction motor wherein holes into which conductors are inserted are formed in the rotor core and aluminium or copper is inserted into the holes by die-casting.

According to the 11th aspect of the present invention, in a rotating electric machine according to claim 2, it is preferred that the keyways are formed into a depth in which a weight imbalance due to lamination of the rotor plates and a weight imbalance of the spider cancel each other.

According to the 12th aspect of the present invention, a manufacturing method of a rotating electric machine, the rotating electrical machine comprises: a stator and a rotor that is rotatably provided through a rotary gap with respect to the stator, wherein the rotor includes a rotor core in which rotor plates punched from roll formed magnetic steel plate are laminated, and a spider that retains the rotor core, wherein the rotor core includes a plurality of keys arranged in their inner circumference contacting with the spider, wherein the spider includes a plurality of keyways arranged in its outer circumference contacting with the rotor, and wherein a plurality of keys of the rotor core and the plurality of keyways of the spider are formed in such a manner that they fit with each other; wherein a roll formed magnetic steel plate is punched so that one of the plurality of keys is arranged at 90 degrees to rolling direction of the steel plate; and the keys of the rotor core and the keyways of the spider are fitted in a combination that renders a weight imbalance of the rotor core due to lamination of the rotor plates and a weight imbalance of the spider cancel each other.

According to the 13th aspect of the present invention, in a manufacturing method of a rotating electric machine according to claim 12, it is preferred that at least one of the plurality of keyways of the spider is formed as a small width keyway which has a smaller width than other keyways; and the plurality of keys of the rotor core and the plurality of keyways of the spider are fitted so that among keys of the plurality of the rotor core, a rotor core minimum mass key, which shows a minimum mass of the rotor core in a direction in which the rotor minimum mass key exists, fits into the small width keyway.

According to the 14th aspect of the present invention, in a manufacturing method of a rotating electric machine according to claim 13, it is preferred that the rotor core is formed by laminating the rotor plates, in such a manner that position of a rotor minimum mass key among a plurality of keys in each of the rotor plates, which is positioned in a thinner part than other part in each of the rotor plates, is piled up.

According to the 15th aspect of the present invention, in a manufacturing method of a rotating electric machine according to claim 12, it is preferred that the spider is mounted to a shaft, a ring plate is inserted into the spider, and a balance adjustment hole, through which a weight imbalance that is left behind to be cancelled by a combination of the rotor core and the spider is complemented, is formed in the ring plate.

According to the present invention, a rotating electric machine and a manufacturing method thereof with high productivity that do not require complex equipment and extra processes can be provided.

DESCRIPTION OF THE PREFERRED EMBODIMENTS

An embodiment of the present invention will be explained below.

As one representative performance of a rotating electric machine, one may refer the accuracy of rotor balancing. The accuracy of rotor balancing directly affects vibrations and noise of the rotating electric machine. Therefore, balance adjustment is essential in the final production process after rotor components are assembled.

In general, the balance of a rotor is adjusted by removing or providing mass in the final production process after all the rotor components are assembled. Accordingly, in the event that an initial imbalance is large in a state where the rotor components are assembled, the removed or provided mass for adjustment becomes large, and, in an extreme case, can not be adjusted to design requirements. Therefore, reduction in the initial imbalance in a state of rotor assembly leads to reduction in man-hours for balance adjustment.

The initial imbalance of the rotor depends on the combined value of the imbalance in each of the components and the imbalance that occurs due to assembly gap between the components. A major part of the initial imbalance of the rotor is accounted for by the imbalance due to accumulated deviation in thickness of the laminated steel plates in the rotor core.

In general, steel plate material of magnetic steel plates used for rotors of rotating electric machines is roll formed, and tiny deviations occur in widthwise thickness of the steel plate material while it is rolled. It goes beyond the limits of the current technology to completely eliminate such deviations. Therefore, in the event that such steel plate material is punched so as to manufacture rotor plates used for a laminated body such as a rotor core, deviations in thickness having a certain directionality as to rolling direction remain on each rotor plate.

When steel plate material is punched keeping the rolling direction and the produced rotor plates are laminated so as to manufacture a laminated body such as a rotor core, tiny amount of deviation in thickness included in each of the rotor plates is accumulated in the laminated body and comes out as a large amount of deviation in thickness. Accordingly, a great initial imbalance occurs at a rotor in which the laminated body is assembled as it is manufactured.

There is a method known in the related art in which rotor cores are manufactured by laminating rotor plates where each rotor plate is rotated for example 180 degree in the plane of a rotor plate as needed so as to avoid accumulation of deviations in thickness in the laminated body. However, there are problems such as that achievement of rotary lamination in punch equipment requires a complex structure of thereof, which needs a large investment in facilities.

Since equipment configured so as to achieve rotary lamination assumes a complex structure, progressive stage pitch becomes large, and in response thereto, a larger press machine capacity is required. In addition, in the event that the cores of rotors and stators are manufactured by simultaneously punching so as to improve material yield, it is a problem that the shortage of the number of stages becomes so serious that existing press machines can not deal therewith.

As described above, a complex equipment structure to rotationally laminate punched steel plates is required in order to resolve the mass imbalance due to the accumulated deviation in plate thickness in the rotor core constituted with laminated steel plates. In the present embodiment, the laminated rotor plates to which rotary lamination is not applied, which does not require complex structure punching equipment, is used as a rotor core so as to provide the rotor of the rotating electric machine that resolves the issue of the mass imbalance.

In the present embodiment, the laminated rotor plates in which rotary lamination is not applied is used as a rotor core so as to assemble the rotor so that the mass imbalance due to the accumulated deviation in plate thickness of the rotor core and the mass imbalance due to the difference between the keyway widths of the shaft or the spider cancel each other.

The rotor in which rotary lamination of the rotor plates is not applied has the mass imbalance due to the accumulated deviation in plate thickness i.e., the initial imbalance as a rotating body. On the other hand, in a shaft or a spider having a plurality of keyways, one of the keyways is defined as the reference, and its width dimension is set smaller than that of any of the others. In other words, the width dimension of the reference keyway is set with a small clearance so that the reference keyway tightly fits the key of the corresponding rotor core, whilst the width dimensions of the other keyways are set with a sufficient clearance that can absorb component dimension tolerance.

The shaft or the spider has the initial imbalance depending upon the difference in width dimension of the keyways. The initial imbalance becomes greater as the axial dimension becomes greater and as the diameter of the keyway position becomes greater.

Next, in the assembly process, the rotors are assembled so that the initial imbalance of the rotor core and the initial imbalance of the shaft or the spider cancel each other, thereby improving the overall initial imbalance.

As a result, the initial imbalance of the rotor in a state where the components are now assembled can be reduced, and, in the following process of balance adjustment, the removed or provided mass that is required to assure the necessary balance accuracy can be reduced. In other words, the man-hours required for the balance adjustment can be reduced, thereby contributing to reduction in cost.

According to an empirical rule, the balance accuracy that can be modified per adjustment is determined by the removed or provided mass. This is because the accuracy after the balance adjustment becomes the accuracy that the error in imbalance amount measurement and the error in the removed or provided mass are combined. According to the present embodiment, the initial imbalance can be reduced, and adjustment accuracy per one balance adjustment process can be improved. In other words, reduction in vibrations and noise can be achieved as a rotating electric machine.

As the present embodiment is applied to the punching equipment, the complex structure of the rotary lamination to cancel the deviation in lamination thickness can be reduced and the equipment construction can be simplified, thereby reducing the cost of investment in facilities. In addition, since the capacity of the press machine can be reduced by shortening the whole length of the stage of punching, manufacturing is made possible using a smaller press machine.

Specific embodiments will be explained below in reference to the drawings.

Embodiment 1

Figure 2:
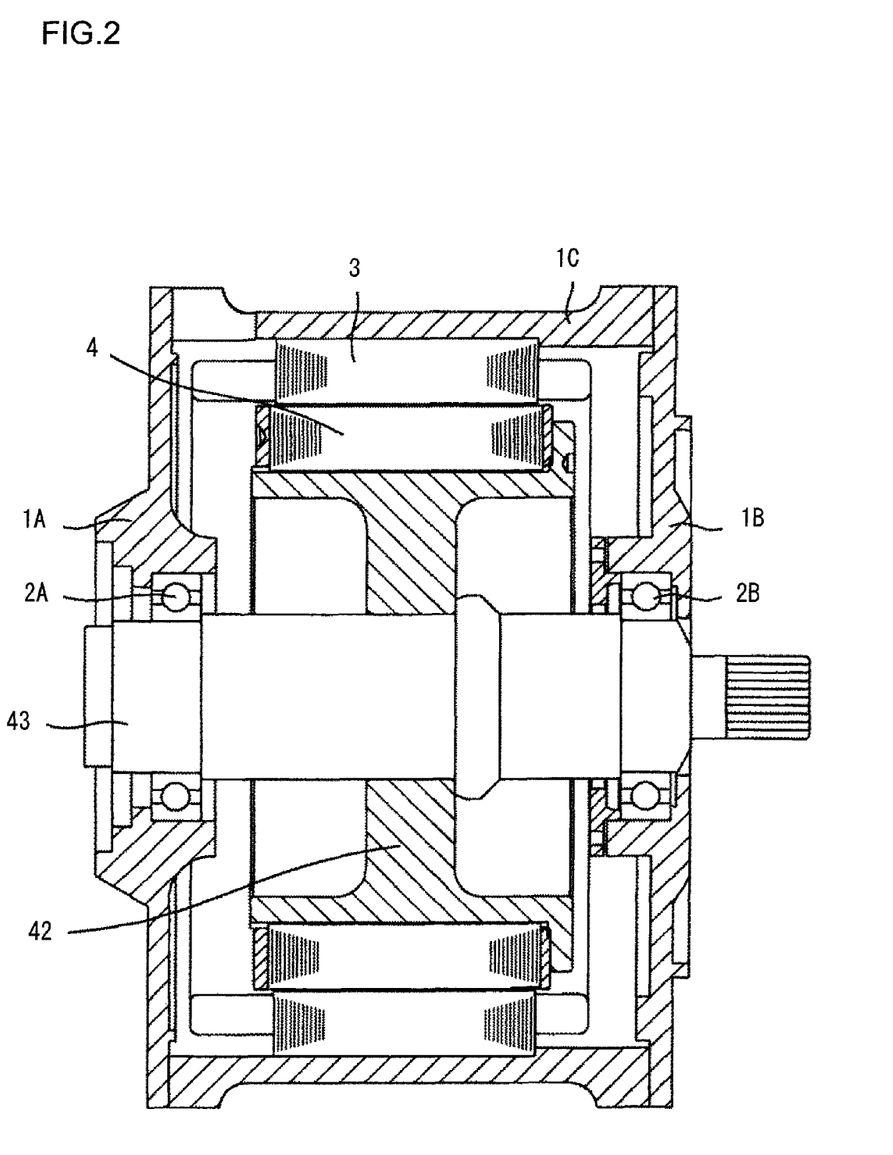
FIG. 2 is a cross-sectional view of the rotating electric machine that constitutes an embodiment of the present invention.

FIG. 2 is an overall cross-section view of the rotating electric machine. A stator 3 is fixed to a housing 1c with fixing the stator core to the housing 1c by interference fitting, and a rotor 4 includes a spider 42 and a shaft 43, being rotatably supported by bearings 2a and 2b. Here, the rotor 4 is supported to be rotatable against the stator 3 with small gap between the rotor and the stator.

Figure 3:
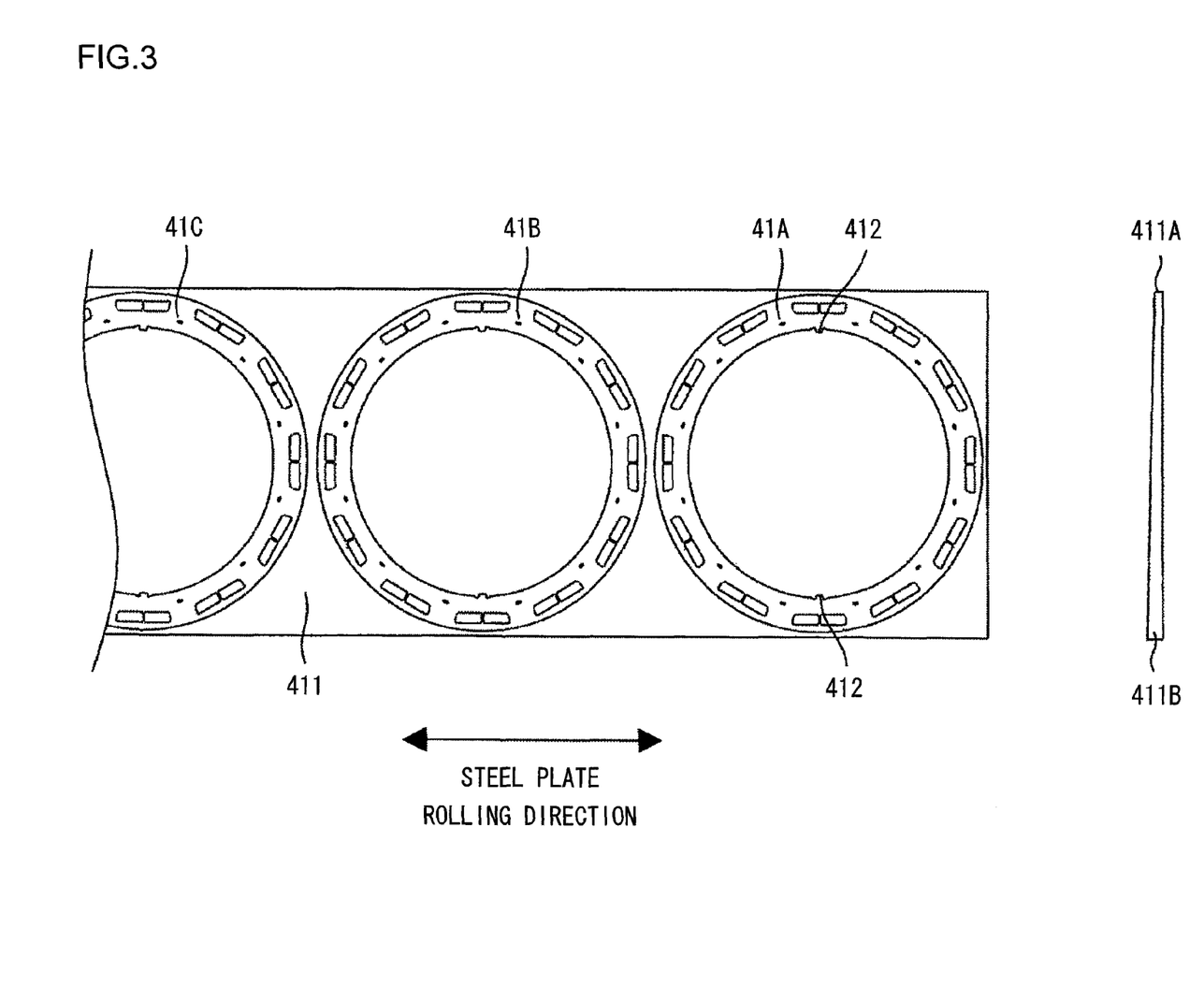
FIG. 3 illustrates punching of the rotor cores that constitute an embodiment of the present invention.
Figure 4:
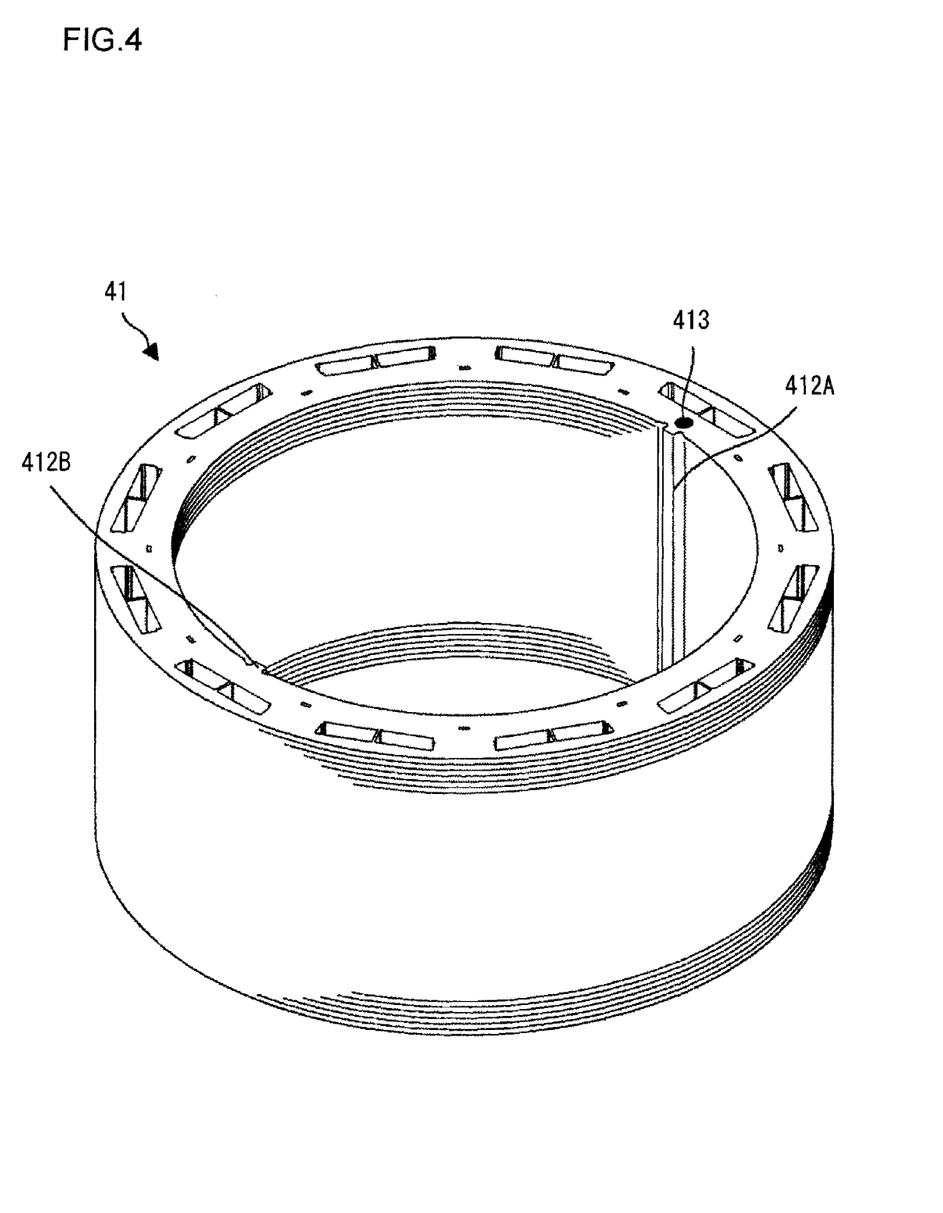
FIG. 4 is a perspective view of the rotor core that constitutes an embodiment of the present invention.

The manufacturing method of rotor core will be explained. FIG. 3 shows how each plate of the rotor core is punched from magnetic steel plate. The magnetic steel plate, a material, is manufactured by rolling, has a deviation in plate thickness at a right angle to the rolling direction of the steel plate shown in FIG. 3, and is thinner towards one side 411a than the other side 411b. Each rotor plate of a rotor core having two key shapes 412 with the same shape in the inner circumference, and these two key shapes 412 are arranged at 90 degrees to the rolling direction of the magnetic steel plate shown in FIG. 3, i.e., in the direction in which the deviation in plate thickness is maximized. In this way, the plates of a rotor core are punched in series. The punched plates are stacked in the punching equipment, and are swaged as a predetermined total thickness has been reached, thus providing a rotor core 41 as presented in FIG. 4. Thus the rotor plates produced by punching are stacked so that the thinner parts of the rotor plates or the thicker parts of the rotor plates are piling up together.

Next, dimension in lamination thickness of the rotor core 41, which is outputted from the punching equipment, is measured, and an identification marking 413 is provided on the side where the dimension in lamination thickness is smaller in the direction of the two keys 412. In the event that the rotor plates are punched as in the arrangement shown in FIG. 3, the greatest accumulated deviation in plate thickness of the material occurs in the direction of the two key shapes 412. In other words, the greatest deviation in lamination thickness, i.e., mass imbalance occurs in the direction of the key shapes 412a and 412b in FIG. 4. In the example, the position of the key shape 412a is thinner or lighter than the other positions, while the position of the key shape 412b is thicker or heavier than the other positions. Thus the key such as the key shape 412a which is positioned in the lightest part of a rotor plate or of a rotor core represents a minimum mass key.

Figure 5:
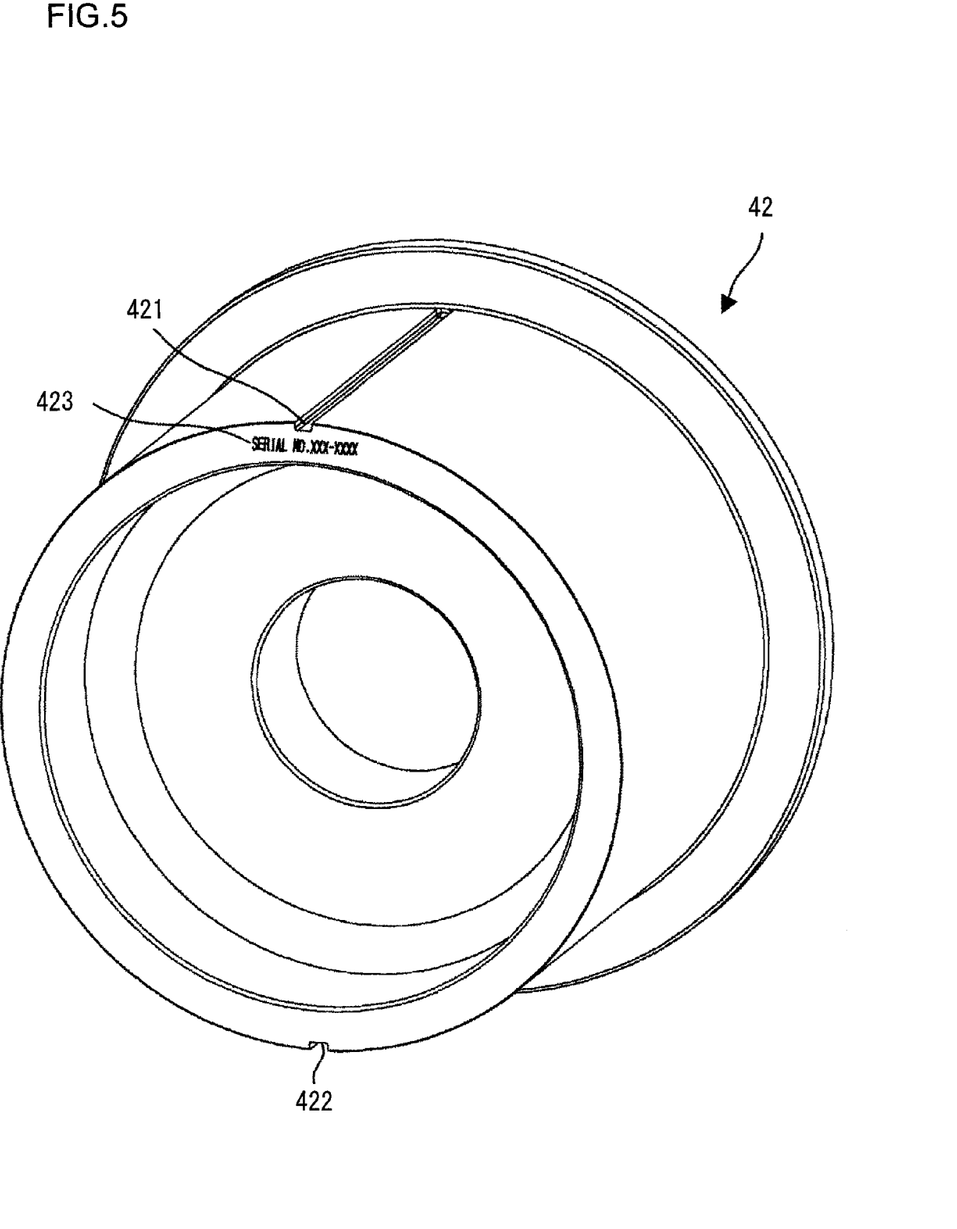
FIG. 5 is a perspective view of the spider that constitutes an embodiment of the present invention.
Figure 6A:
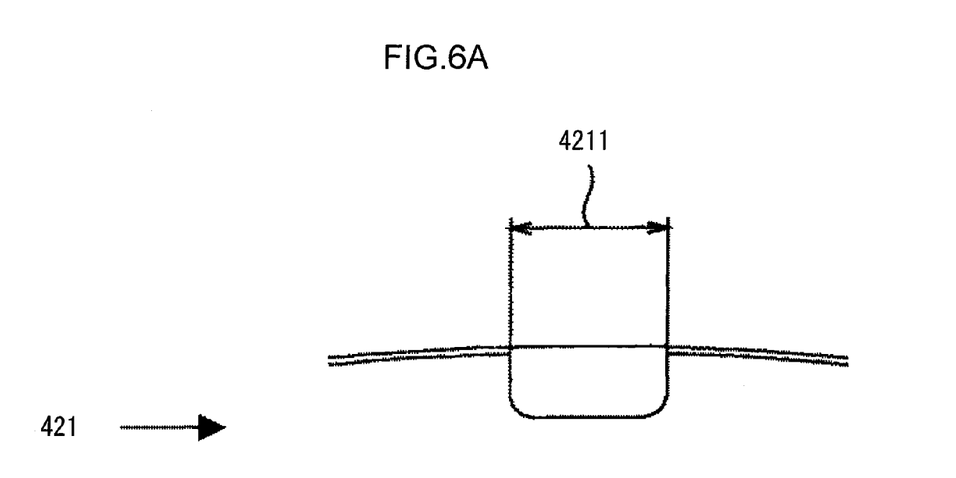
FIG. 6A and FIG. 6B illustrate the keyway shape of the shaft or the spider that constitutes an embodiment of the present invention.
Figure 6B:
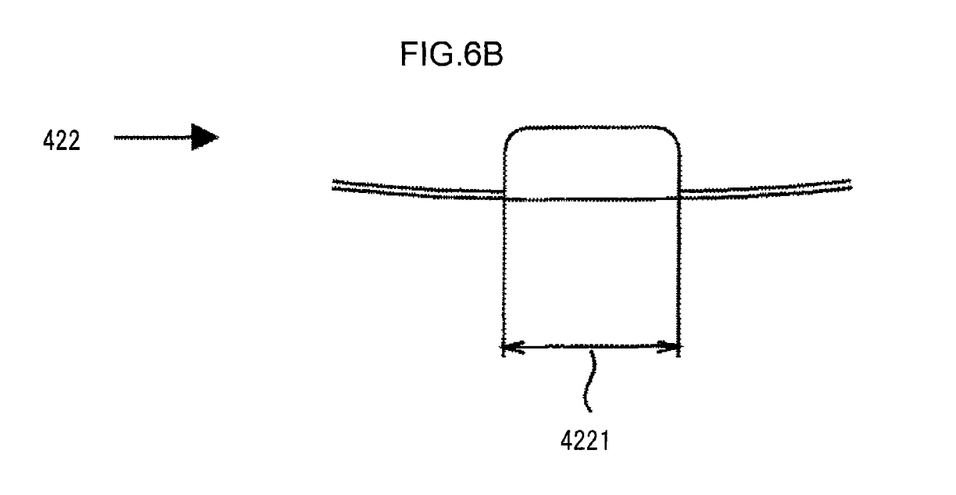

Next, the spider 42 in FIG. 5 will be explained. The spider 42 includes keyways 421 and 422 on the outer circumference which is in contact with the rotor core, corresponding to the key shapes 412 of the rotor core. The width of the keyway 421 is set so that the keyway 421 tightly fits the key shape 412 of the rotor core, whilst the width of the keyway 422 is set so that the keyway 422 can absorb the tolerances of shape and position dimensions of the key shapes 412 of the rotor core and the tolerances of shape and the position dimensions the keyway 422 itself. As a result, the width of the keyway 421 becomes smaller than that of the keyway 422. It is to be noted that the depths of the both keyways are same. FIG. 6A shows the shape of the keyway 421 and FIG. 6B shows the shape of the keyway 422. A keyway width 4211 is smaller than a keyway width 4221. This causes the spider 42 to have a mass imbalance occurring in the direction of the two keyways. In other words, the mass is heavy at the keyway 421 position while it is light at the keyway 422 position in the spider 42. Here, as shown in FIG. 5, a direction identification 423 of the mass imbalance is provided on the side where the keyway position at which the mass is heavy, i.e., the keyway 421 side. In the example, the mark of a serial number of a component is denoted by the identification 423.

Figure 1:
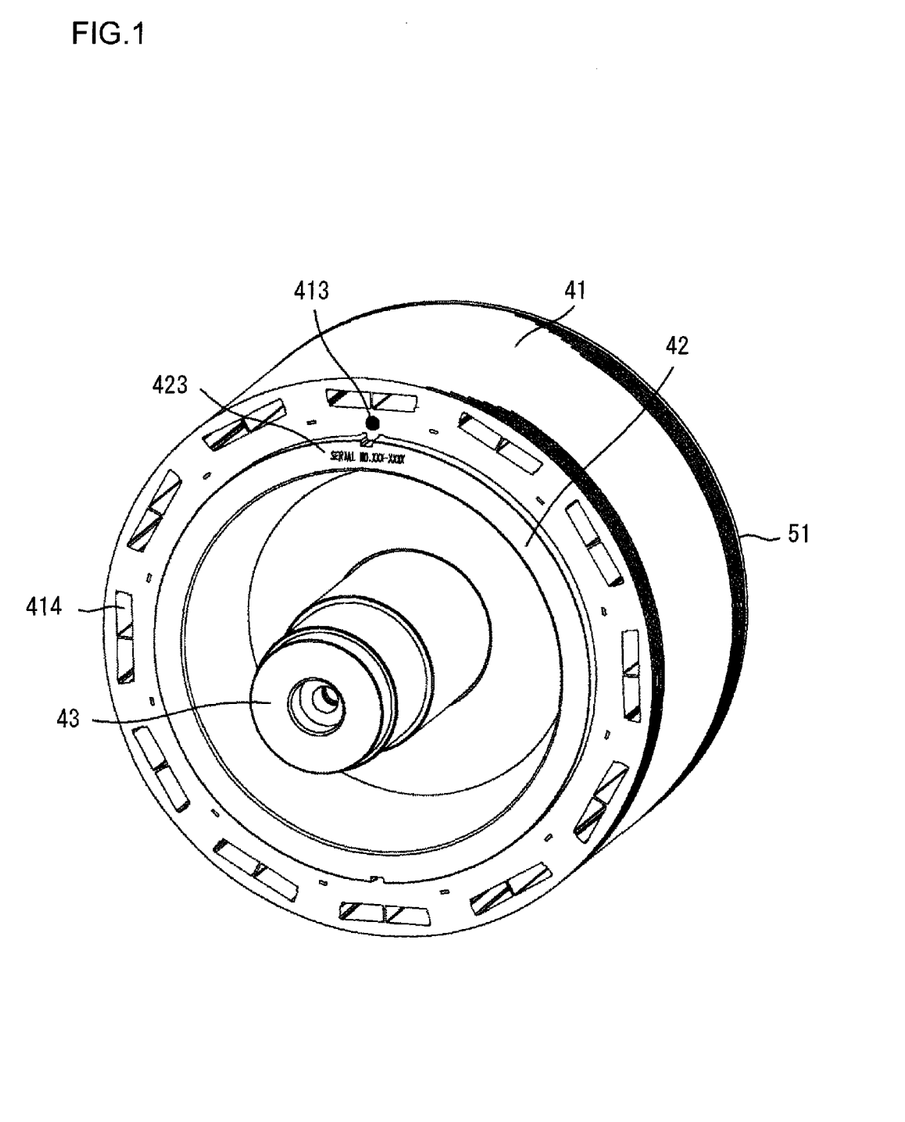
FIG. 1 is a perspective view of the manufacturing process of the permanent magnet type rotating electric machine rotor that constitutes an embodiment of the present invention.

Next, assembly of the rotor will be explained. FIG. 1 presents a perspective view of a state in which the rotor core 41, the spider 42, and the shaft 43 are assembled. The spider 42 is assembled to the shaft 43 by shrink fitting, and a ring plate 51 is inserted into the spider 42. Next, the rotor core 41 is assembled to the spider 42 so that the identification marking 413 of the rotor core 41 and the identification 423 of the spider 42 match. In other words, the key of the light side of the mass of the rotor core 41 is fitted with the keyway of the heavy side of the mass of the spider 42. This results in achieving an effect that the mass imbalance of the rotor core 41 and that of the spider 42 cancel each other.

Figure 7:
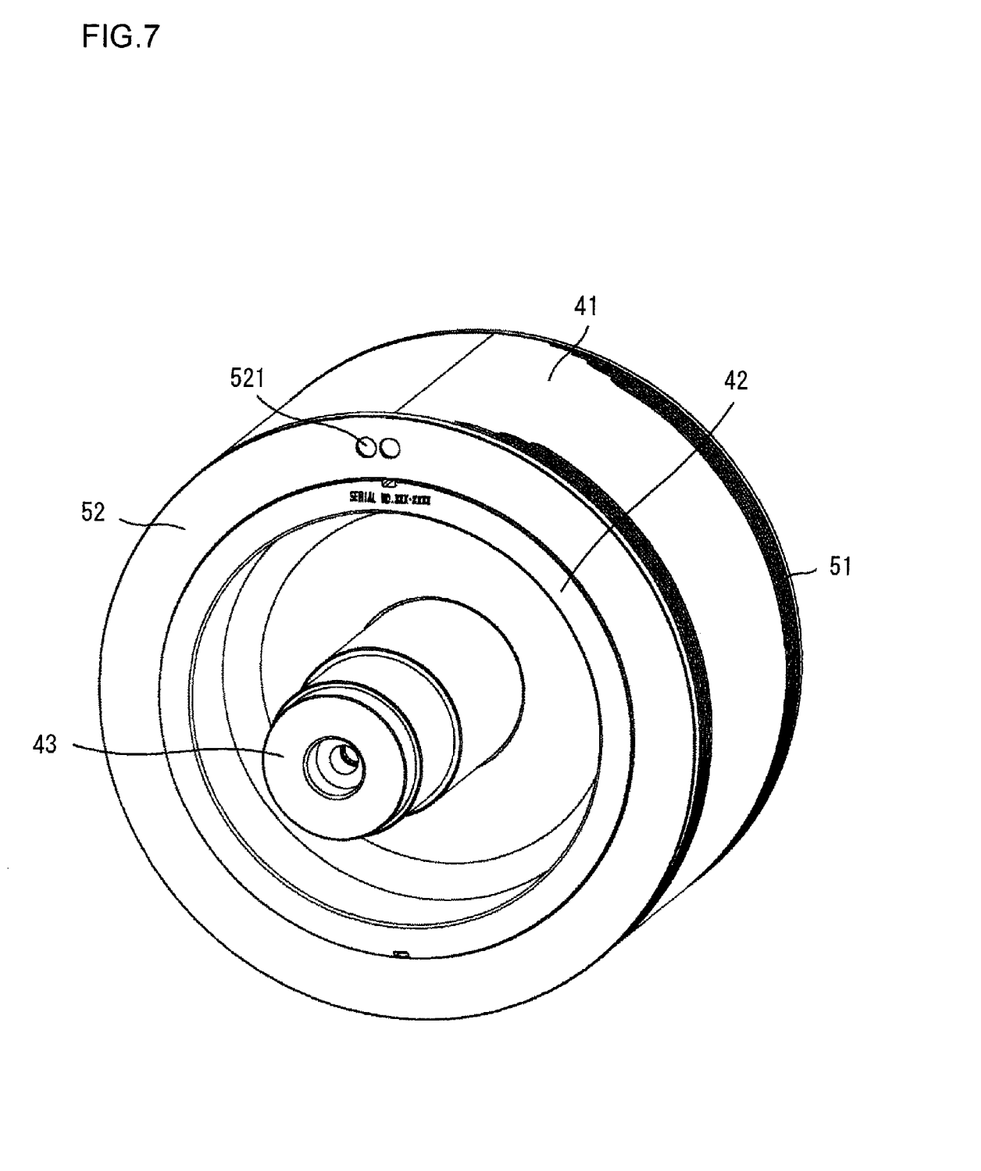
FIG. 7 is a perspective view of the rotor that constitutes an embodiment of the present invention.

Next, permanent magnets that are not herein figured are inserted into holes 414 of the rotor core 41, and a ring plate 52 shown in FIG. 7 is assembled thereto by shrink fitting. The final balance adjustment is effected in a state where all the rotating components are assembled. The imbalance amount the rotor has is measured using a balancing machine, and in response to the measurement result, the mass is removed by boring a balance adjustment hole 521 in the ring plate 52, so that the balance of the rotor is adjusted to be within a specified value. Since the initial imbalance amount of the rotor before adjustment has been improved by applying the present embodiment, the mass to be processed by removing is low. In other words, the man-hours for removal processing are reduced. In addition, reduction in the amount of removal processing has an advantage in view of the rotation strength of the ring plate 52, thereby improving the reliability of the rotor.

As described earlier, a small initial imbalance amount enables an adjustment with higher balance accuracy, thereby reducing vibrations and noise as a rotating electric machine.

Embodiment 2

Next, an example of the application in the embodiment 1, in which the rotor core 41 is constructed by dividing the laminated plates into blocks each with a thickness divided from the total lamination thickness and rotary stacking of each block is adopted, will be explained. All the processes except the lamination structure of the rotor core are the same as those of the embodiment 1.

Figure 8:
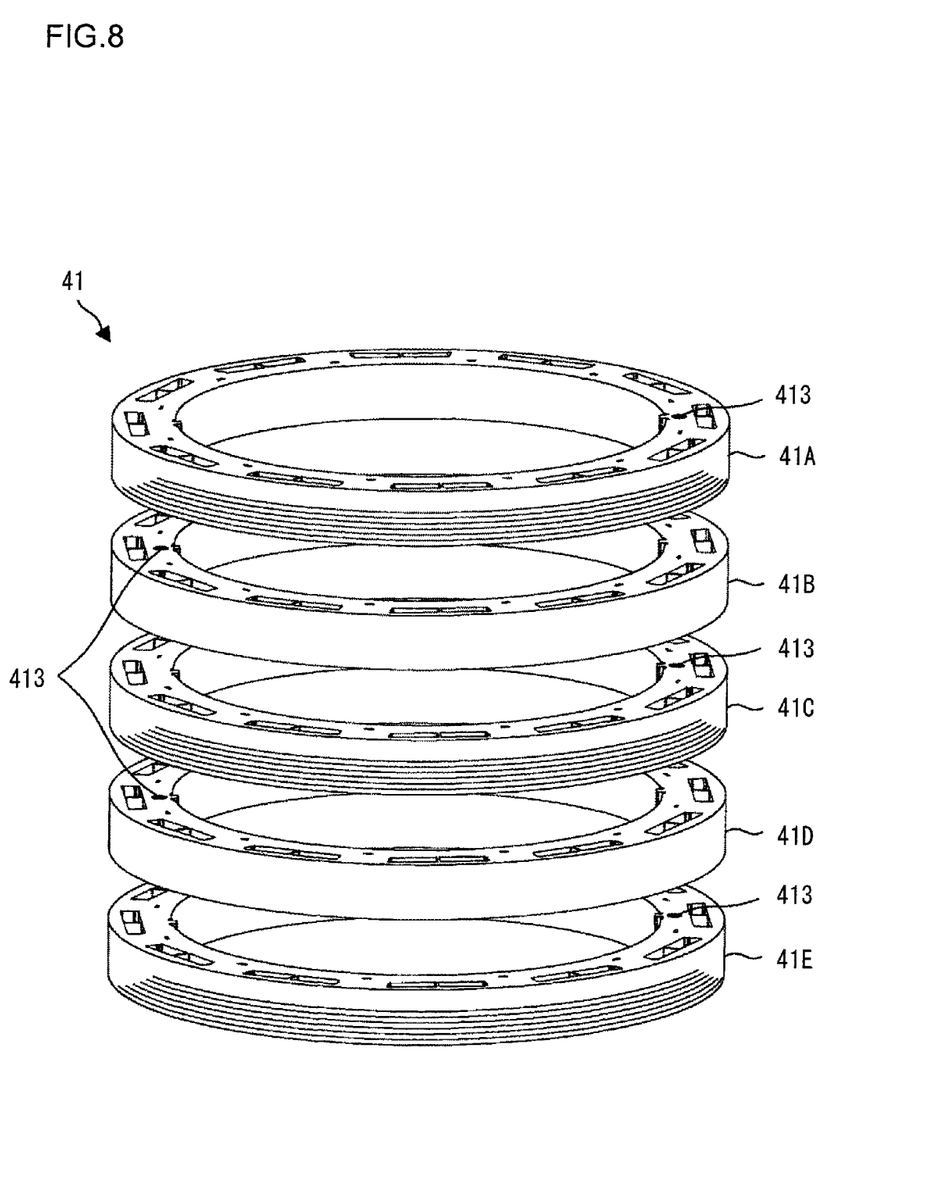
FIG. 8 is a perspective view of the rotor core that constitutes an embodiment of the present invention.

FIG. 8 illustrates the structure of the rotor core 41 in which rotary stacking of blocks is applied. Each plate in a laminated block with a predetermined thickness is punched in the same manner as that in the embodiment 1, and each block is rotated by 180 degrees when the rotation is necessary for balancing, thus the rotor core being constructed with the stacked blocks. It should be understood that when such rotary stacking is applied for stacking the blocks, an identification marking, is provided in the position of each block where the mass of each block is minimum, namely in the vicinity of the minimum mass key of the laminated rotor plate, indicating a minimum mass key of a block. In FIG. 8, the identification markings 413 of building blocks 41*a*, 41*c*, and 41*e* are in the same direction, the identification markings 413 of constituent blocks 41*b* and 41*d* are arranged in the opposite direction thereof by rotating the constituent blocks 41*b* and 41*d* by 180 degrees, and thus the rotor core 41 is constructed.

As shown in FIG. 8, in the event that the rotor core 41 is divided into an odd number of blocks, the effect of improving the initial imbalance of the rotor can be achieved in the similar manner as the embodiment 1. In addition, the lamination thickness of blocks and the number of blocks to be rotated by 180 degrees may be arranged so as to balance out the mass imbalance that the spider 42 has.

In the event that the rotor core 41 is divided into an even number of blocks, deviation in lamination thickness of laminated steel plate can be theoretically cancelled by rotation lamination of the blocks, and the mass imbalance of the rotor core 41 itself can be reduced to zero. However, it is possible to purposely give the rotor core 41 the equal mass imbalance to that the spider 42 has by rotating an appropriate number of blocks by 180 degrees so as to cancel the mass imbalance due to the keyway of the spider 42.

Embodiment 3

The rotor of an induction motor to which the present embodiment is applied will be explained.

Figure 9:
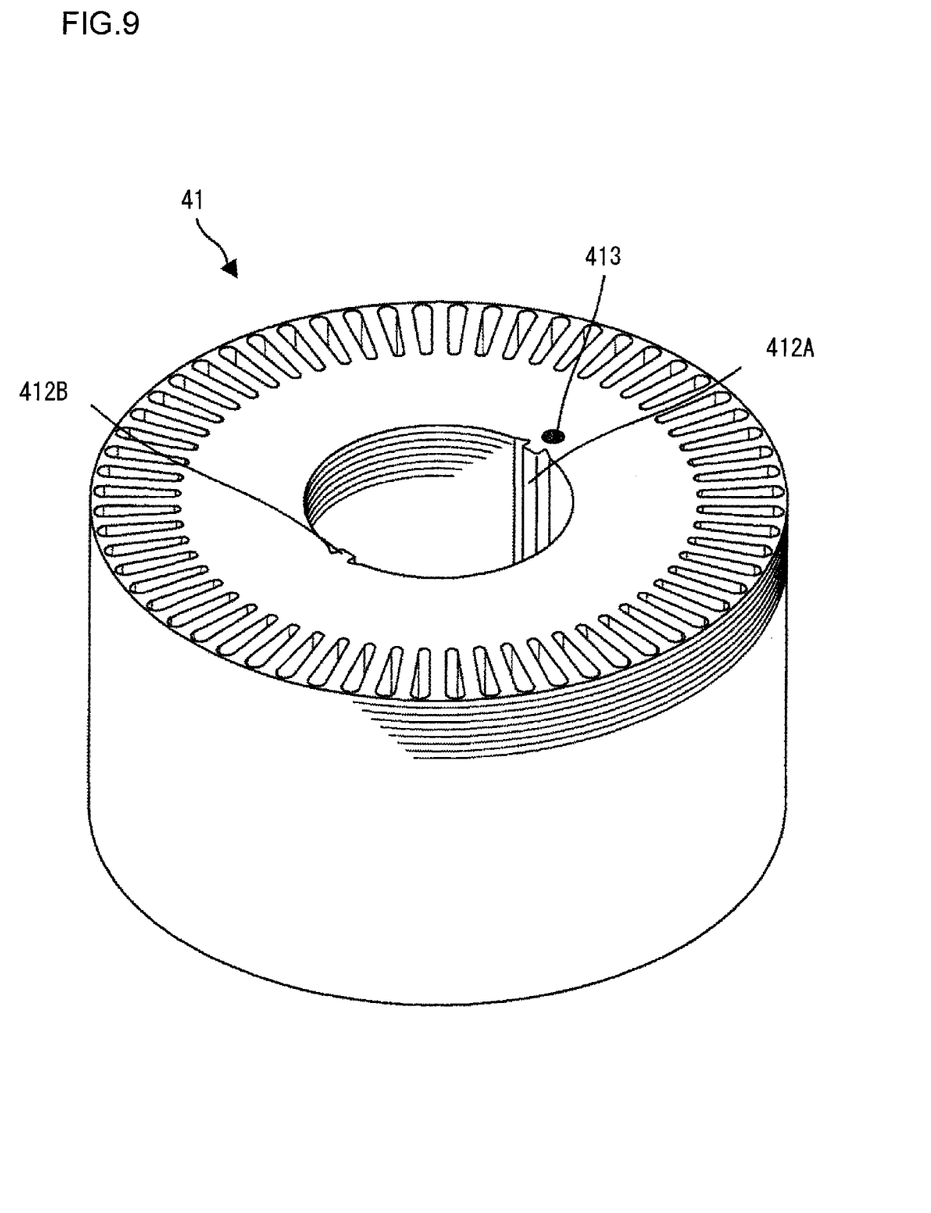
FIG. 9 is a perspective view of the rotor core of the induction motor that constitutes an embodiment of the present invention.

FIG. 9 shows a perspective view of the rotor core 41 of the induction motor. In the case of the induction motor, in the same manner as the embodiment 1, a steel plate is punched so that the key shapes 412 are arranged at 90 degrees to the rolling direction of the magnetic steel plate, and laminated to a predetermined lamination thickness without applying rotary lamination. Then, a lamination thickness measurement is performed, and the identification marking 413 is provided on the key shape 412*a* position, in which lamination thickness is smaller.

Figure 10:
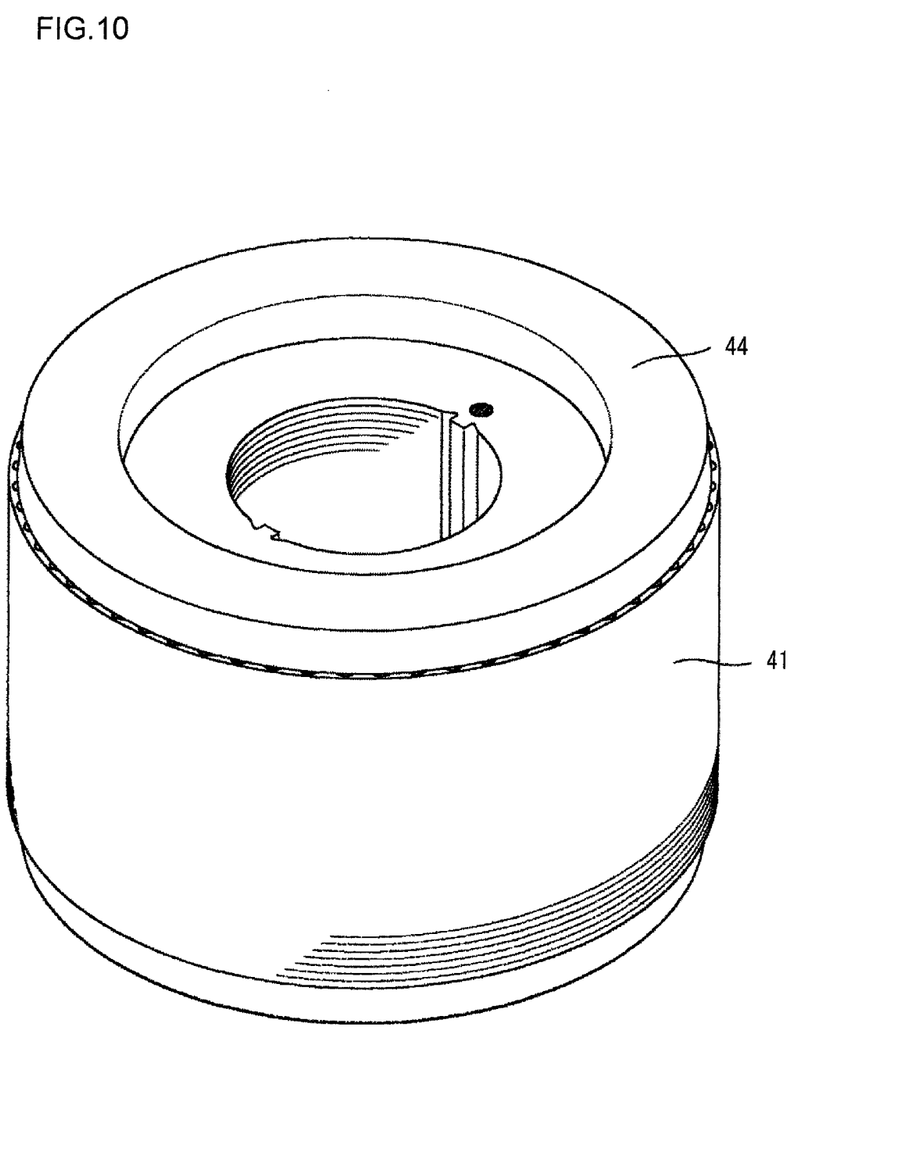
FIG. 10 is a perspective view of the manufacturing process of the rotor that constitutes an embodiment of the present invention.

Next, a temporary shaft is inserted and aluminium or copper is die-casted so as to form a conductor section 44 of a squirrel-cage rotor as shown in FIG. 10.

Figure 11:
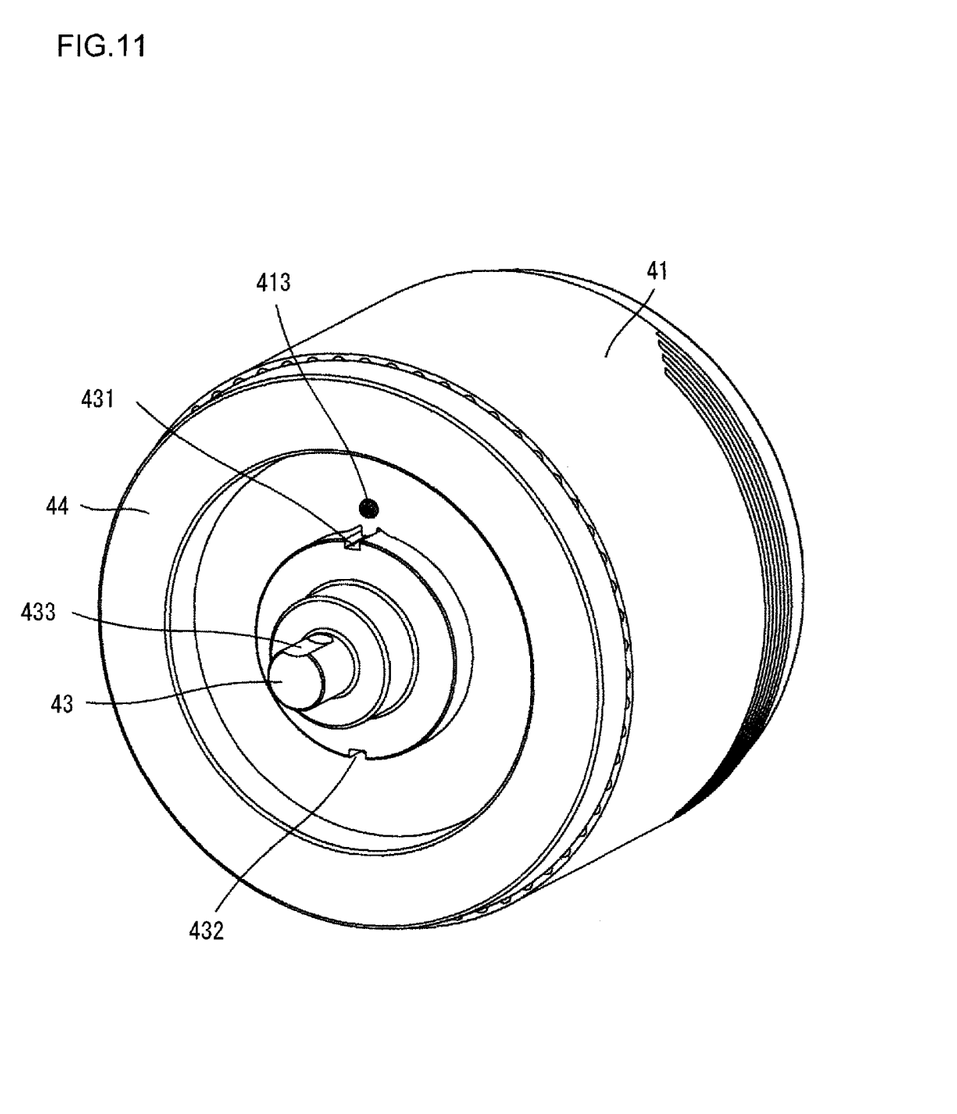
FIG. 11 is a perspective view of the manufacturing process of the rotor that constitutes an embodiment of the present invention.

FIG. 11 shows a perspective view of the rotor into which the shaft 43 is inserted. The shaft 43, which is inserted thereinto, is provided with keyways which correspond to the keys of the rotor core 41, and the width of the keyway 431 is set smaller than that of the keyway 432, thereby having a mass imbalance. The mass at the keyway 431 position is heavier than that at the keyway 432 position. The direction of the keyway 431 is identified using a groove 433 provided on the shaft 43. The rotor is constructed by inserting the shaft 43 so that the identification marking 413 of the rotor core 41 and an identification 433 of the shaft 43 match. In the similar manner as the embodiment 1, this allows the imbalance amounts of the rotor core 41 and the shaft 43 to be cancelled each other, thereby improving the initial imbalance and achieving the same effect as that in the embodiment 1.

Figure 12:
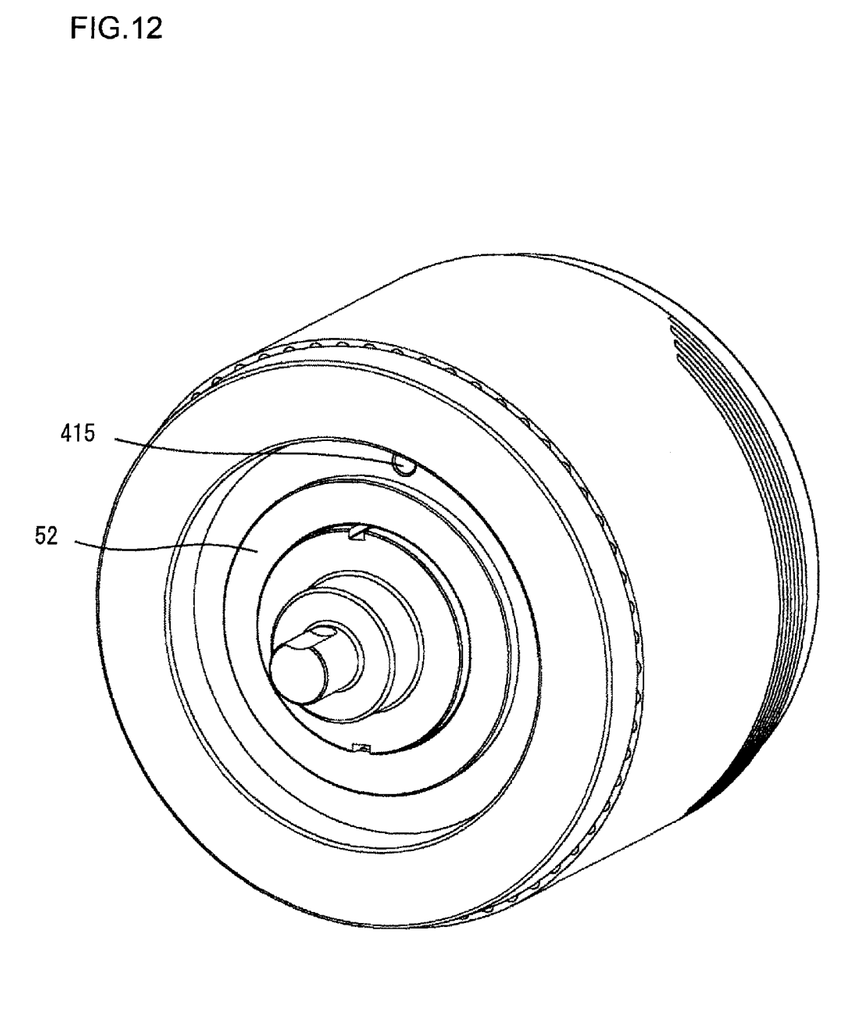
FIG. 12 is a perspective view of the rotor that constitutes an embodiment of the present invention.

As shown in FIG. 12, the ring plate 52 is assembled by shrink fitting for avoiding slipping off of the shaft in the axial direction, and then, a balance adjustment is conducted. The balance adjustment is conducted by boring the hole 415 in the rotor core 41 to a specified balance accuracy.

Embodiment 4

Another embodiment will be explained. The present embodiment is applied to the shaft or the spider of the rotor of the rotating electric machine including a plurality of keyways so as to resolve the initial imbalance due to the difference in keyway width described above.

In the rotor of the rotating electric machine as shown in FIG. 1, when the rotor core is constructed by rotationally laminating punched steel plates, deviation in lamination thickness of the rotor core has been resolved and no initial imbalance has occurred in the rotor core. However, since there must be a difference in the widths of the two keyways of the shaft or the spider, when the depths of both keyways are same, this causes the initial imbalance to occur in the shaft or the spider. In order to solve this problem, the depths of the keyways may be set corresponding to the difference in the widths of the keyways of the shaft or the spider, thereby resolving the initial imbalance.

Figure 13A:
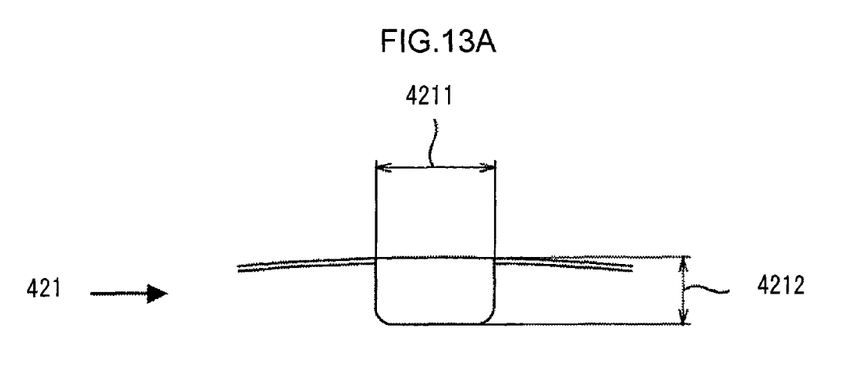
FIG. 13A and FIG. 13B illustrate the keyway shape of the shaft or the spider that constitutes an embodiment of the present invention.
Figure 13B:
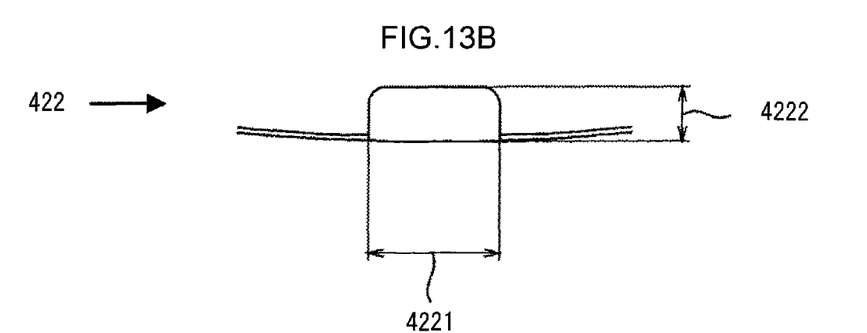

The shapes of the keyways 421 and 422 when the present embodiment is applied to the spider 42 shown in FIG. 6A and FIG. 6B are shown in FIG. 13A and FIG. 13B. A width 4211 of the keyway 421 (see FIG. 13A) is set smaller than a width 4221 of the keyway 422 (see FIG. 13B), and a depth 4212 of the keyway 421 is set greater than a depth 4222 of the keyway 422. As a result, the amount of material of the spider 42 to be removed for the keyway 421 and the amount for the keyway 422 become equal, thereby resolving the initial imbalance of the spider 42.

Though in the above production method it is described about the method to laminate the thinner parts or the thicker parts of rotor plates, it should be understood that the rotary lamination may be applied to the rotor core production method, where each rotor plate is rotated as needed. The rotary lamination may be carried out by alternating the direction of each rotor plate, or by rotating the directions of rotor plates for every couple of rotor plates, or rotating each rotor plate as needed.

Further, in a similar manner, the rotary lamination may be applied to the above described production method of a block, so as to rotate the direction of each rotor plate as needed. In this case also the rotary lamination may be carried out by alternating the direction of each rotor plate, or by rotating the directions of rotor plates for every couple of rotor plates, or rotating each rotor plate as needed.

The rotor core or the block thus produced by rotary lamination has already a largely reduced mass imbalance. However, there is still remaining some mass imbalance between the two keys of the rotor core.

For example, when the number of rotary laminated rotor plates in a rotor or a block is odd, the mass the rotor is less in the position where more minimum mass keys of rotor plates are stacked. When the number of rotary laminated rotor plates is even, the mass imbalance is further reduced, in which case the minimum mass key may be determined by measuring the weights of the positions of two keys. In any case, after assembling a rotor core, the mass imbalance is adjusted by arranging a balance adjustment hole 521 in the ring plate 52.

The above described embodiments are examples, and various modifications can be made without departing from the scope of the invention.

What is claimed is:

1. A rotating electric machine comprising:
a stator and a rotor that is rotatably provided through a rotary gap with respect to the stator, wherein
the rotor includes a rotor core in which rotor plates punched from roll formed magnetic steel plate are laminated, and a spider that retains the rotor core;
the rotor plates and the rotor core include a plurality of keys arranged in their inner circumference contacting with the spider;
the spider includes a plurality of keyways arranged in its outer circumference contacting with the rotor;
a plurality of keys of the rotor core and a plurality of keyways of the spider are formed in such a manner that they fit with each other; and
the plurality of keys of the rotor core and the plurality of keyways of the spider fit in a combination that renders a weight imbalance of the rotor core due to lamination of the rotor plates and a weight imbalance of the spider cancel each other.

2. A rotating electric machine according to claim 1, wherein:
at least one of the plurality of keyways of the spider is formed as a small width keyway which has a smaller width than other keyways, and
among the plurality of keys of the rotor core, a rotor core minimum mass key, which shows that a mass of the rotor core in a direction in which the rotor minimum mass key exists is minimum, is fitted into the small width keyway.

3. A rotating electric machine according to claim 2, wherein:
in position of the rotor core minimum mass key, among the plurality of keys of the rotor plates, a rotor plate minimum mass key, a rotor plate minimum mass key, which is a key indicating a part of the rotor plate where the rotor plate have less thickness than other part is piled up.

4. A rotating electric machine according to claim 2, wherein:
an identification marking is provided in a vicinity of the rotor core minimum mass key.

5. A rotating electric machine according to claim 2, wherein:
the rotor core is provided with lamination of the rotor plates, wherein the rotor plates are rotary laminated as needed, so that a part of a rotor core in a position of the rotor core minimum mass key is smaller in mass than any other part located in positions of other keys.

6. A rotating electric machine according to claim 2, wherein:
the rotor core is provided by rotationally stacking an odd number of blocks, wherein in each block a rotor plate minimum mass key, which is a key indicating a part of the rotor plate where the rotor plate have less thickness than other part, is piled up.

7. A rotating electric machine according to claim 1, wherein:
a rotating electric machine is an induction motor wherein holes into which conductors are inserted are formed in the rotor core and aluminium or copper is inserted into the holes by die-casting.

8. A rotating electric machine according to claim 1, wherein:
the rotor core is fitted into the spider by shrink-fitting, whereby the rotor core is fitted into the spider in such a manner that the keys and the keyways are fitted together.

9. A rotating electric machine according to claim 1, wherein:
magnet insertion holes are formed in the rotor core, and magnets are respectively inserted into the magnet insertion holes.

10. A rotating electric machine according to claim 1, wherein:
a shaft is fitted into the spider and as well a ring plate is fitted into the spider, and a balance adjustment hole, through which a weight imbalance that is left behind after weight imbalance cancellation by a combination of the rotor core and the spider is complementary cancelled, is formed in the ring plate.

11. A rotating electric machine according to claim 2, wherein:
the keyways are formed into a depth in which a weight imbalance due to lamination of the rotor plates and a weight imbalance of the spider cancel each other.

* * * * *